US011786982B2

(12) United States Patent
Dufour

(10) Patent No.: US 11,786,982 B2
(45) Date of Patent: Oct. 17, 2023

(54) CUTTING TOOL COMPRISING TOOLHOLDER AND ROUND CUTTING INSERT AND METHOD FOR REPOSITIONING THE ROUND CUTTING INSERT IN A POCKET OF THE TOOLHOLDER

(71) Applicant: KENNAMETAL INC., Latrobe, PA (US)

(72) Inventor: Jean Luc Dufour, Latrobe, PA (US)

(73) Assignee: KENNAMETAL INC., Latrobe, PA (US)

( * ) Notice: Subject to any disclaimer, the term of this patent is extended or adjusted under 35 U.S.C. 154(b) by 0 days.

(21) Appl. No.: 17/240,019

(22) Filed: Apr. 26, 2021

(65) Prior Publication Data
US 2022/0339721 A1 Oct. 27, 2022

(51) Int. Cl.
*B23C 5/22* (2006.01)

(52) U.S. Cl.
CPC ...... *B23C 5/2213* (2013.01); *B23C 2200/045* (2013.01); *B23C 2200/168* (2013.01); *B23C 2210/168* (2013.01)

(58) Field of Classification Search
CPC .......... B23C 2210/126; B23C 2210/16; B23C 2210/084; B23C 2210/161; B23C 2200/167; B23C 2200/162; B23C 2200/202; B23C 2200/168; B23C 2200/163; B23C 5/2213; B23C 2200/165; B23C 5/22; B23C 5/202; B23B 2200/165; B23B 2200/16; B23B 2205/12; B23B 2200/0461; B23B 2200/167; B23B 2200/162; B23B 2200/161; B23B 2200/3627

See application file for complete search history.

(56) References Cited

U.S. PATENT DOCUMENTS

| 349,475 A | * | 9/1886 | Barclay | ................. | B23B 27/083 407/113 |
| 1,460,030 A | * | 6/1923 | Mattson | ................. | B23C 5/202 407/41 |

(Continued)

FOREIGN PATENT DOCUMENTS

| CN | 105269058 A | 1/2016 |
| DE | 102009049088 A1 | 4/2011 |

(Continued)

*Primary Examiner* — Sara Addisu
(74) *Attorney, Agent, or Firm* — Christopher J. Owens

(57) ABSTRACT

A cutting tool including a toolholder and a round cutting insert for mounting on a pocket floor of the toolholder. The toolholder includes the toolholder pocket floor having a bore therein and a plurality of grooves in the pocket floor arranged radially about the bore, wherein adjacent grooves are radially offset by a groove offset angle x. The round cutting insert includes an upper surface having a cutting edge, a lower surface opposite the upper surface, an exterior side surface between the upper surface and the lower surface, an interior side surface defining an aperture extending from the upper surface to the lower surface, and a plurality of lugs arranged radially about the aperture, wherein adjacent lugs are radially offset by a lug offset angle y, and wherein a ratio of y:x is an integer greater than or equal to 2.

9 Claims, 5 Drawing Sheets

(56) References Cited

U.S. PATENT DOCUMENTS

| | | | |
|---|---|---|---|
| 2,289,344 A * | 7/1942 | Cedarleaf | B23B 27/06 407/120 |
| 5,236,288 A * | 8/1993 | Flueckiger | B23C 5/2213 407/62 |
| 5,658,100 A | 8/1997 | Deiss et al. | |
| 5,810,518 A | 9/1998 | Wiman et al. | |
| 5,924,826 A * | 7/1999 | Bystrom | B23B 29/046 407/103 |
| 5,931,613 A * | 8/1999 | Larsson | B23B 27/08 407/103 |
| 6,146,060 A * | 11/2000 | Rydberg | B23C 5/10 407/103 |
| 6,152,658 A * | 11/2000 | Satran | B23B 27/00 407/120 |
| 6,238,133 B1 * | 5/2001 | DeRoche | B23C 5/2213 407/34 |
| 6,626,614 B2 * | 9/2003 | Nakamura | B23B 51/06 408/233 |
| 6,926,472 B2 * | 8/2005 | Arvidsson | B23B 27/12 407/92 |
| 7,001,114 B2 * | 2/2006 | Blucher | B23B 27/007 407/103 |
| 7,121,771 B2 | 10/2006 | Englund | |
| 7,156,006 B2 | 1/2007 | Hyatt et al. | |
| 7,325,471 B2 * | 2/2008 | Massa | B23B 31/003 407/103 |
| 7,490,533 B2 * | 2/2009 | Dehn | B23G 5/06 407/103 |
| 7,607,867 B2 | 10/2009 | Benson | |
| 7,722,297 B2 | 5/2010 | Dufour et al. | |
| 7,908,945 B2 | 3/2011 | Dufour et al. | |
| D658,218 S | 4/2012 | Morrison et al. | |
| 8,147,171 B2 | 4/2012 | Dufour et al. | |
| 8,573,901 B2 * | 11/2013 | de Souza Filho | B23B 31/4006 407/42 |
| 8,573,903 B2 | 11/2013 | Morrison et al. | |
| 8,657,539 B2 | 2/2014 | Morrison et al. | |
| D709,110 S | 7/2014 | Morrison et al. | |
| 8,858,130 B2 | 10/2014 | Morrison et al. | |
| 9,011,049 B2 | 4/2015 | Fang et al. | |
| 9,120,154 B2 * | 9/2015 | Hecht | B23B 29/06 |
| 9,283,626 B2 | 3/2016 | Fang et al. | |
| 9,505,065 B2 | 11/2016 | Morrison et al. | |
| 9,656,334 B2 | 5/2017 | Saji et al. | |
| 10,173,275 B2 * | 1/2019 | Roman | B23C 5/2247 |
| 10,252,355 B2 | 4/2019 | Marie et al. | |
| 10,363,616 B2 | 7/2019 | Yamada | |
| 10,406,608 B2 | 9/2019 | Brown et al. | |
| 2003/0210961 A1 * | 11/2003 | Arvidsson | B23C 5/06 407/113 |
| 2004/0028486 A1 * | 2/2004 | Englund | B23B 27/164 407/90 |
| 2004/0057785 A1 * | 3/2004 | Blucher | B23B 27/10 403/348 |
| 2005/0047885 A1 | 3/2005 | Hyatt et al. | |
| 2005/0152754 A1 * | 7/2005 | Wiman | B23B 27/1611 407/103 |
| 2007/0009334 A1 * | 1/2007 | Edler | B23B 27/1625 407/107 |
| 2007/0011860 A1 | 1/2007 | Dehn et al. | |
| 2007/0122242 A1 * | 5/2007 | Englund | B23B 27/1622 407/103 |
| 2008/0145159 A1 | 6/2008 | Benson | |
| 2011/0103905 A1 * | 5/2011 | Morrison | B23C 5/2213 407/113 |
| 2012/0251250 A1 * | 10/2012 | Morrison | B23B 27/1622 407/42 |
| 2013/0279994 A1 * | 10/2013 | Morrison | B23C 5/202 407/103 |
| 2014/0086694 A1 * | 3/2014 | Fang | B23C 5/2213 407/113 |
| 2014/0086696 A1 * | 3/2014 | Fang | B23C 5/2213 407/103 |
| 2014/0212226 A1 * | 7/2014 | Saji | B23B 27/1622 407/33 |
| 2014/0294525 A1 * | 10/2014 | Hecht | B23B 27/1651 407/103 |
| 2016/0207124 A1 * | 7/2016 | Brown | B23C 5/202 |
| 2017/0291232 A1 * | 10/2017 | Yamada | B23B 27/1662 |
| 2017/0291233 A1 | 10/2017 | Marie et al. | |
| 2021/0129239 A1 * | 5/2021 | Dufour | B23C 5/2213 |
| 2021/0379679 A1 * | 12/2021 | Bonenfant | B23C 5/06 |

FOREIGN PATENT DOCUMENTS

| | | | |
|---|---|---|---|
| JP | 11245105 A * | 9/1999 | B23C 5/109 |
| JP | 2013075337 A | 4/2013 | |
| JP | 2014076505 A * | 5/2014 | B23C 5/2221 |
| JP | 5754331 B2 | 7/2015 | |

* cited by examiner

CUTTING TOOL COMPRISING TOOLHOLDER AND ROUND CUTTING INSERT AND METHOD FOR REPOSITIONING THE ROUND CUTTING INSERT IN A POCKET OF THE TOOLHOLDER

FIELD

The present application relates to the field of cutting tools comprising round cutting inserts, and in particular, to anti-rotation mechanisms for the same.

BACKGROUND

Cutting inserts used in cutting tools such as milling cutters are typically mounted in complementary-shaped pockets spaced around a periphery of a tool body. The cutting inserts are typically secured within their respective pockets by screws inserted through an aperture provided in the center of the cutting insert. During a cutting operation, such cutting inserts often experience not only compressive and vibratory forces, but some amount of torque due to the angle between the cutting edges of the cutting inserts and the workpiece. For cutting inserts of non-round shapes, such torque does not result in rotation of the cutting insert due to the interference-type fit between the angled exterior sidewalls of such cutting inserts and the complementary-shaped walls of the pocket that receive them. By contrast, round cutting inserts can rotate within their respective pockets since no such mechanical interference naturally arises between the exterior sidewalls of round cutting inserts and walls of the pockets which receive them.

To prevent such unwanted rotation of round cutting inserts, several anti-rotation mechanisms have been developed previously.

In an example, a single lug is provided on a pocket of a toolholder to engage with one of a plurality of grooves on a round cutting insert to retain the round cutting insert against rotation. As the corresponding portion of the cutting edge of the round cutting insert is worn by the cutting operation, the round cutting insert is repositioned such that the lug engages with another one of the plurality of grooves to expose an unworn portion of the cutting edge of the round cutting insert to the cutting operation. Such round cutting inserts are provided with a different number of grooves (e.g. 4, 6, 8) depending on the desired depth of the cut. However, during machining, a heavy feed tends to cause damage to or even remove the single lug from the pocket, thus reducing the life of the round cutting insert and ruining the tool holder.

In another example, a plurality of lugs (e.g. 4, 6, 8) are provided on a pocket of a toolholder to engage with a corresponding plurality of grooves (e.g. 4, 6, 8) on a round cutting insert to overcome the problem with damaging a single lug. However, the toolholder is limited to use with a cutting insert having the same number of grooves as the number of lugs on the pocket of the toolholder.

Thus, there is a need for an anti-rotation mechanism for round cutting inserts which overcomes the problems of the prior art.

SUMMARY

In one embodiment, a cutting tool includes a toolholder and a round cutting insert for mounting on a pocket floor of the toolholder. The toolholder includes the toolholder pocket floor having a bore therein and a plurality of grooves in the pocket floor arranged radially about the bore, wherein adjacent grooves are radially offset by a groove offset angle x. The round cutting insert includes an upper surface having a cutting edge, a lower surface opposite the upper surface, an exterior side surface between the upper surface and the lower surface, an interior side surface defining an aperture extending from the upper surface to the lower surface, and a plurality of lugs arranged radially about the aperture, wherein adjacent lugs are radially offset by a lug offset angle y, and wherein a ratio of y:x is an integer greater than or equal to 2.

In another embodiment, a method for repositioning the round cutting insert in the toolholder pocket includes unfastening the round cutting insert from the toolholder pocket, rotating the round cutting insert by a rotation angle z, and fastening the round cutting insert in the toolholder pocket. The rotation angle z may be, for example, about 45 degrees, about 60 degrees, or about 90 degrees.

In yet another embodiment, a toolholder includes a pocket floor having a bore hole therein, and a plurality of grooves in the pocket floor arranged radially about the bore hole, wherein adjacent grooves are radially offset by a groove offset angle x.

In yet another embodiment, a round cutting insert includes an upper surface having a cutting edge, a lower surface opposite the upper surface, an exterior side surface between the upper surface and the lower surface, an interior side surface defining an aperture extending from the upper surface to the lower surface, and a plurality of lugs arranged radially about the aperture, wherein adjacent lugs are radially offset by a lug offset angle y.

Other embodiments of the disclosed cutting tools will become apparent from the following detailed description, the accompanying drawings and the appended claims.

DETAILED DESCRIPTION

Figure 1:
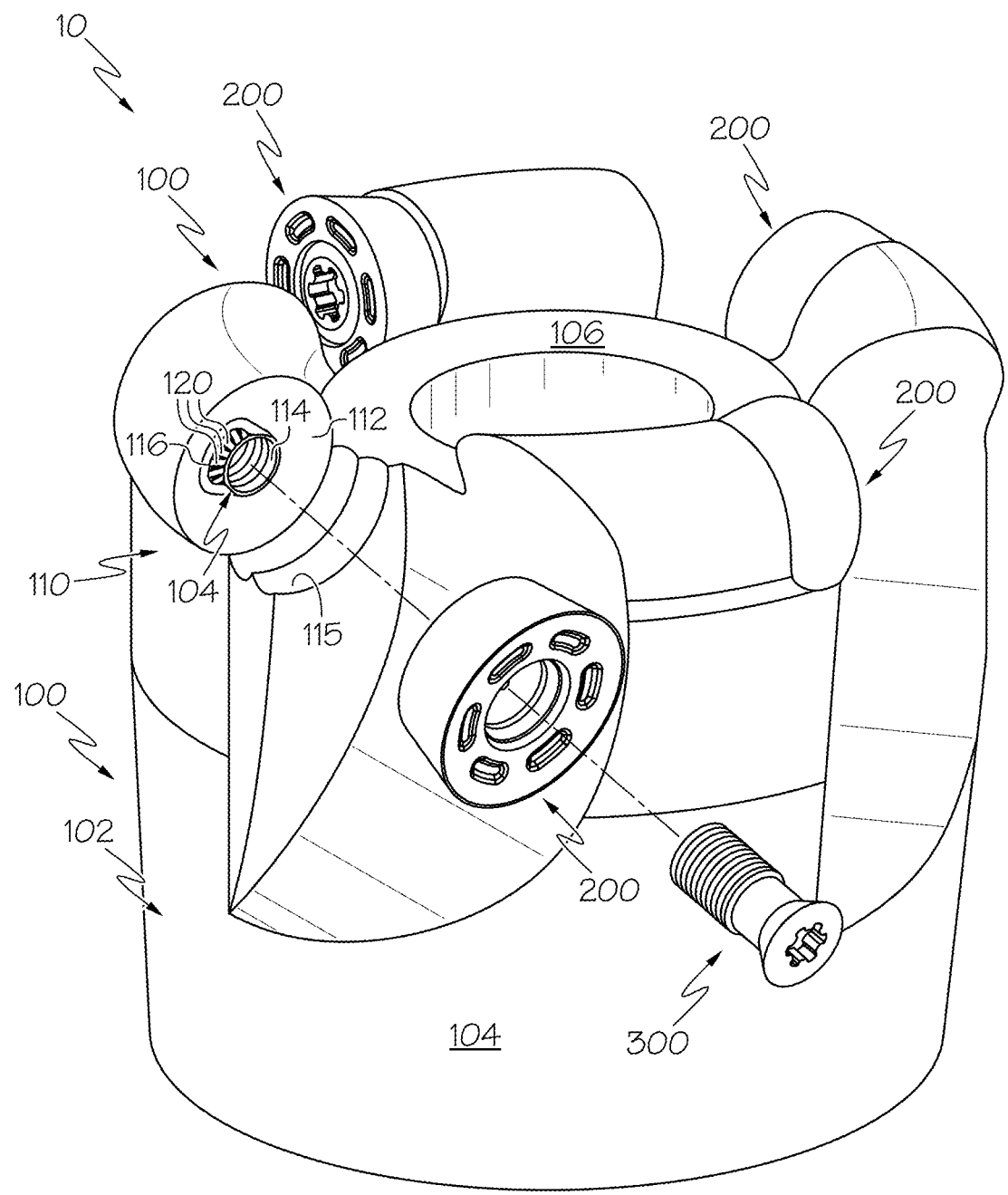
FIG. 1 is a cutting tool according an exemplary embodiment of the present description, including a toolholder a round cutting insert, and a fastener.

FIG. 1 illustrates a cutting tool 10 according an exemplary embodiment of the present description. The cutting tool 10 includes a toolholder 100 and a round cutting insert 200. The cutting tool 10 may further include a fastener 300.

The toolholder 100 as illustrated in FIG. 1 is exemplary. It will be understood that the toolholder 100 of the present description can include any toolholder 100 capable of holding the round cutting insert 200 of the present description.

Referring to FIG. 1, the toolholder 100 includes a toolholder body 102. As illustrated, the toolholder body 102 has the form of a toolholder body for a milling cutter but may have the shape of a toolholder body for any other cutting tool capable of holding the round cutting insert 200 of the present description. The toolholder body 102 may, for example, include a toolholder shank 104 and a toolholder face 106. The toolholder material may be made of any material not inconsistent with the objectives of the present description.

Referring to FIG. 1, the toolholder body 102 includes a toolholder pocket 110. The toolholder pocket 110 may include any structure configured for receiving the round cutting insert 200 of the present description. As shown, the toolholder pocket 110 may be formed into the toolholder body 102. The toolholder pocket 110 is configured to retain the round cutting insert 200 therein. The toolholder body 102 may further include one or more additional toolholder pockets 110 for holding one or more additional round cutting inserts 200.

Referring to FIG. 1, the toolholder pocket 110 includes a pocket floor 112 having an bore 114 therein. The bore 114 may be threaded for receiving a threaded fastener 300. The toolholder pocket 110 may further include a pocket sidewall 115 for supporting the round cutting insert 200 during a cutting operation.

Figure 2:
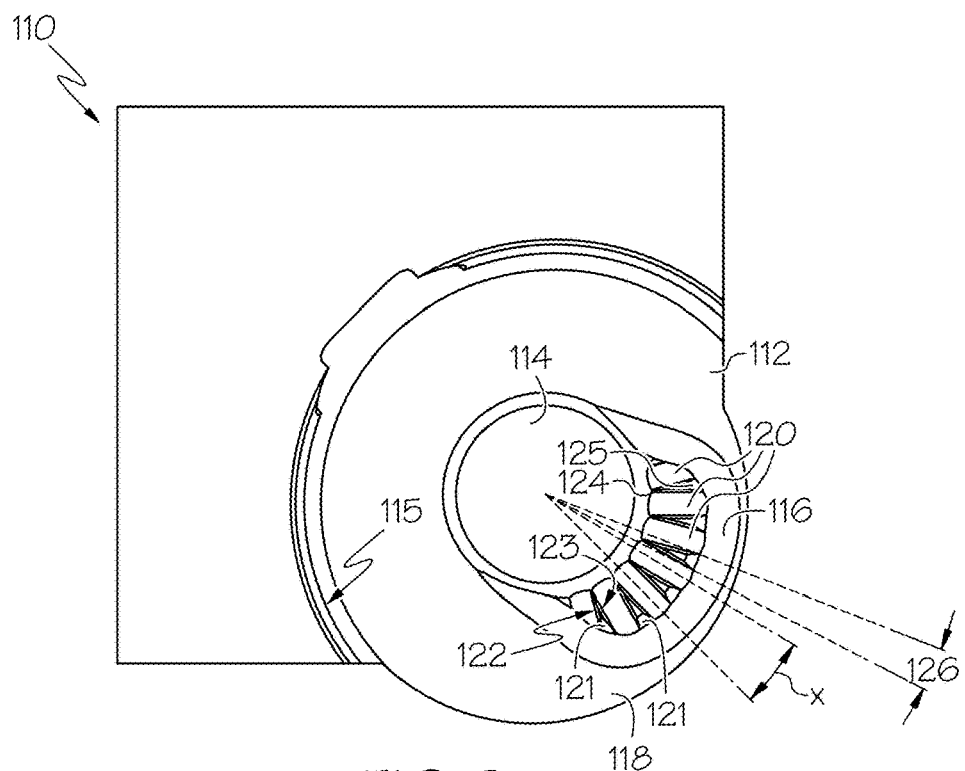
FIG. 2 is a top view of a pocket of the toolholder of FIG. 1.
Figure 3:
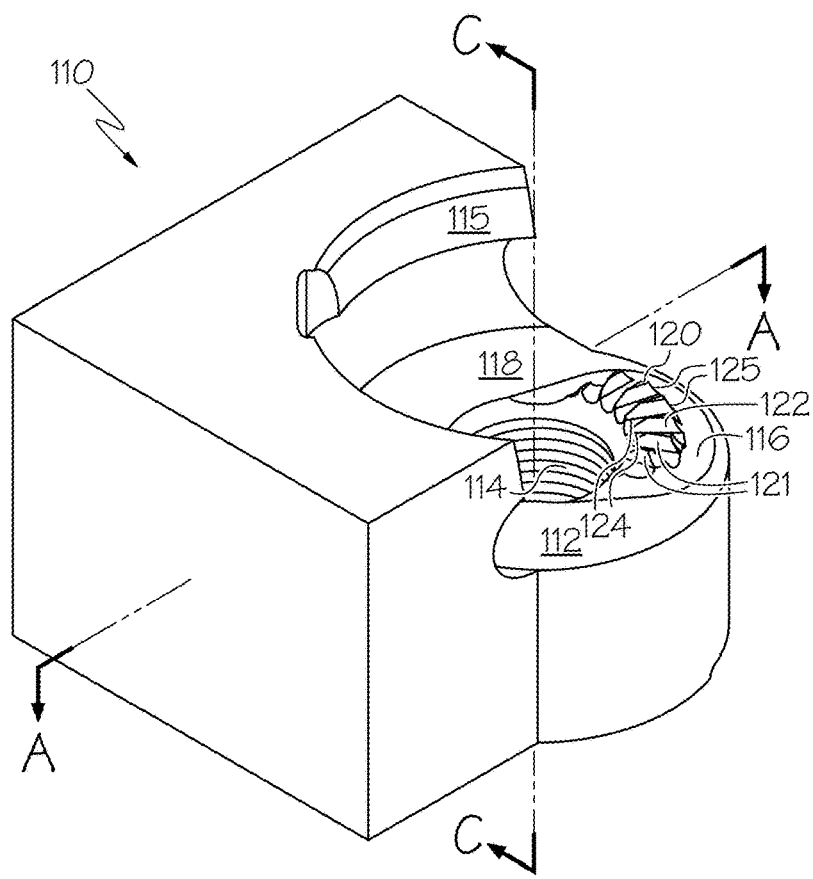
FIG. 3 is a top perspective view of the pocket of FIG. 2, including section line A-A.

Referring to FIGS. 2 and 3, a plurality of grooves 120 in the pocket floor 112 are arranged radially about the bore 114. As shown, the plurality of grooves 120 are arranged about only a portion of the entire periphery of the bore 114. Alternatively, the plurality of grooves 120 may be arranged about the entire periphery of the bore 114. Adjacent grooves 120 of the plurality of grooves 120 are radially offset by a groove offset angle x.

The plurality of grooves 120 may be formed into a raised island 116 that is raised relative to a base 118 of the pocket floor 112. As shown in FIGS. 1 to 3, the raised island 116 may be positioned about only a portion of the bore 114. Alternatively, the raised island 116 may be positioned about the entire periphery of the bore 114. The base 118 may typically take the form a generally planar surface. The raised island 116 may facilitate manufacturability of the pocket floor 112. During a manufacturing of the pocket floor 112, the raised island 116 may be initially formed without the plurality of grooves 120. Thereafter, the plurality of grooves 120 may be substractively formed (e.g. machined) into the raised island 116.

Figure 7:
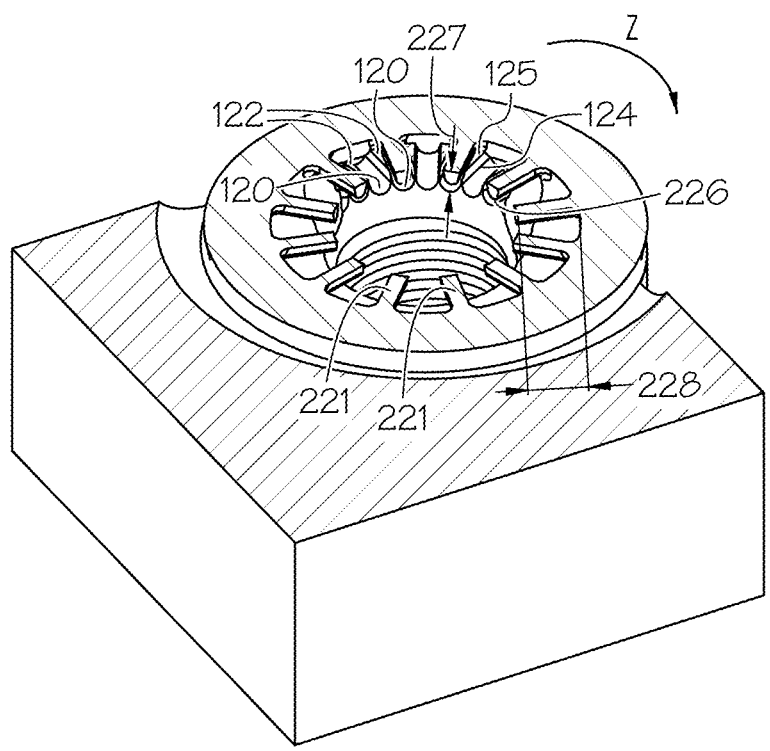
FIG. 7 is a sectional view of FIGS. 3 and 6 along section lines A-A and B-B.

Referring to FIGS. 2, 3, and 7, the plurality of grooves 120 may be defined by a plurality of segments 121 positioned between the plurality of grooves 120. Each segment 121 may include a first segment engagement surface 122 and a second segment engagement surface 123 opposite the first segment engagement surface 122. Thus, the first segment engagement surface 122 of one segment 121 and a second segment engagement surface 123 of an adjacent segment 121 may define a groove 120 positioned therebetween.

The upper edge of the first segment engagement surface 122 and the upper edge of the second segment engagement surface 123 may define a maximum angular segment width 126, which is defined in terms of degrees about the bore 114. In an aspect, the maximum angular segment width 126 of each segment 121 may be less than the groove offset angle x to facilitate a maximum density of segments 121 positioned on the pocket floor 112 and to avoid interference of the segments 121 with the cutting insert 200.

Each segment 121 may further include an inner end 124 proximate the bore 114 and an outer end 125 opposite the inner end 124. In an aspect, the first segment engagement surface 122, the second segment engagement surface 123, the inner end 124, and the outer end 125 may include slanted surfaces to provide for an increased resistance of the segments 121 against damage during operation of the cutting tool 10. In an aspect, the outer end 125 may have a higher width than the inner end 124 to facilitate a decreased maximum angular segment width 126 of each segment 121.

Figure 4:
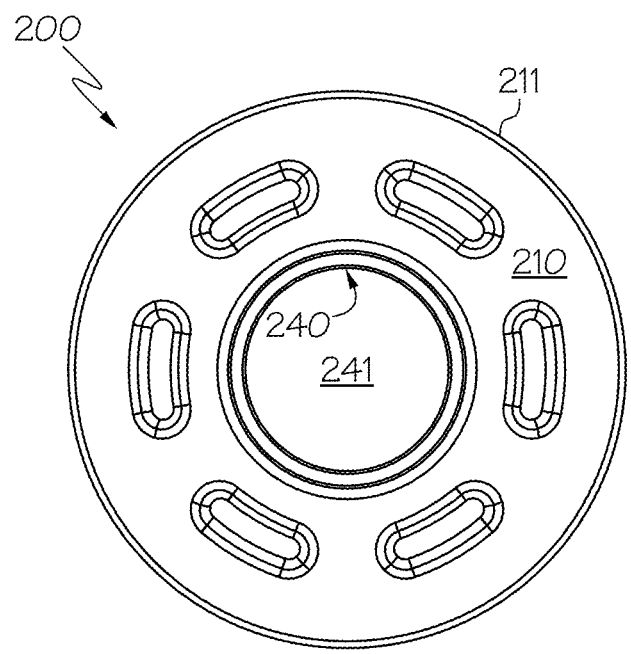
FIG. 4 is a top view of the round cutting insert of FIG. 1.
Figure 5:
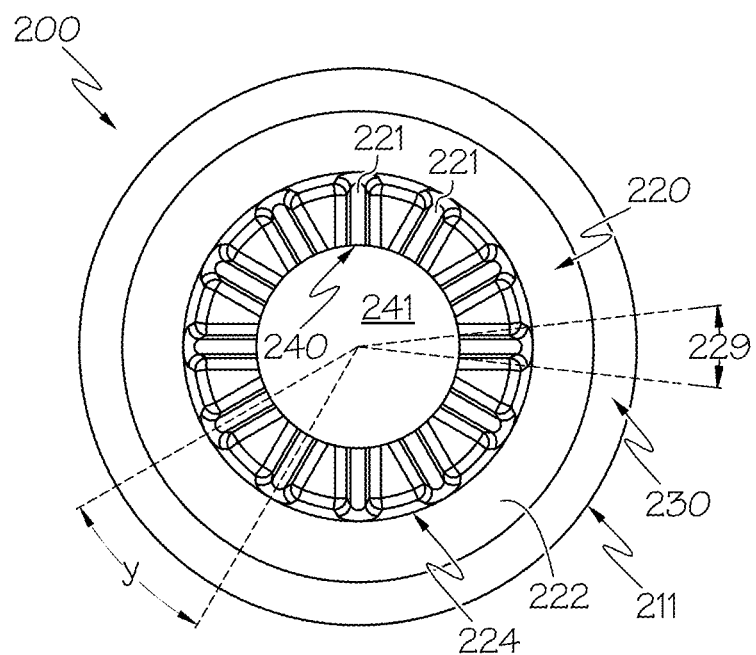
FIG. 5 is a bottom view of the round cutting insert of FIG. 4.
Figure 6:
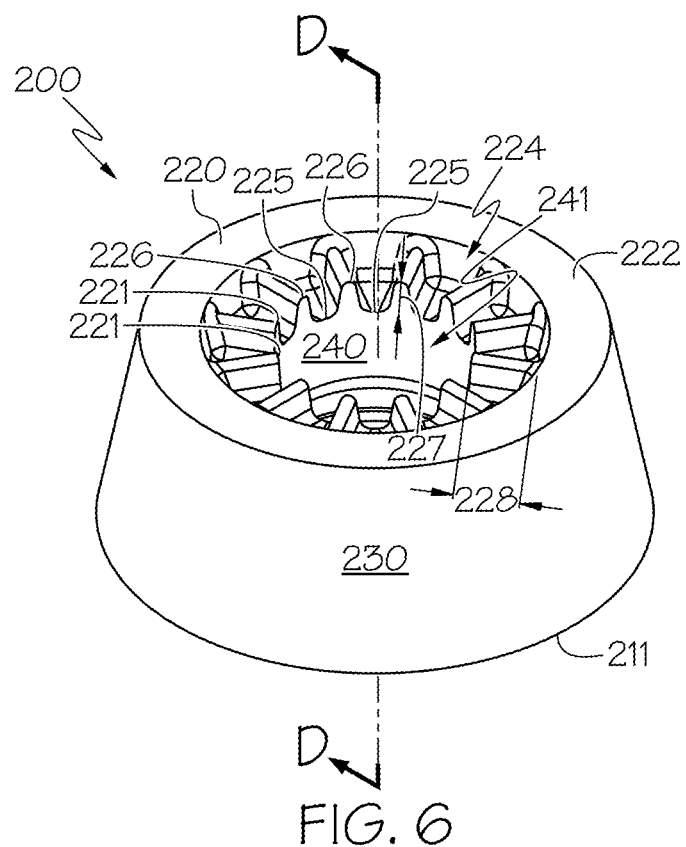
FIG. 6 is a bottom perspective view of the round cutting insert of FIG. 4, including section line B-B.

FIGS. 4 to 6 illustrate an exemplary round cutting insert 200 according to the present description.

The cutting insert 200 may be formed of any material not inconsistent with the objectives of the present description. Exemplary materials include cemented carbide, carbide, polycrystalline diamond, polycrystalline cubic boron nitride, ceramic, cermet, steel or other alloy. In a specific example, the substrate is formed of cemented carbide. A cemented carbide substrate may include tungsten carbide (WC). WC can be present in any amount not inconsistent with the objectives of the present description. For example, WC can be present in an amount of at least 70 weight percent, in an amount of at least 80 weight percent, or in an amount of at least 85 weight percent. Additionally, a metallic binder of cemented carbide can include cobalt or cobalt alloy. Cobalt, for example, can be present in a cemented carbide substrate in an amount ranging from 1 weight percent to 15 weight percent. In some embodiments, cobalt is present in a cemented carbide substrate in an amount ranging from 5-12 weight percent or from 6-10 weight percent. Further, a cemented carbide substrate may exhibit a zone of binder enrichment beginning at and extending inwardly from the surface of the substrate. Cemented carbide substrates can also include one or more additives such as, for example, one or more of the following elements and/or their compounds: titanium, niobium, vanadium, tantalum, chromium, zirconium and/or hafnium. In some embodiments, titanium, niobium, vanadium, tantalum, chromium, zirconium and/or hafnium form solid solution carbides with WC of the substrate. For example, the substrate can include one or more solid solution carbides in an amount ranging from 0.1-5 weight percent. Additionally, a cemented carbide substrate can include, for example, nitrogen. In an aspect, the cutting insert 200 may be a coated body, including one or more coatings.

The round cutting insert 200 includes an upper surface 210 having a cutting edge 211, a lower surface 220 opposite the upper surface 210, an exterior side surface 230 between the upper surface 210 and the lower surface 220, and an interior side surface 240 defining an aperture 241 extending from the upper surface 210 to the lower surface 220. When the round cutting insert 200 is mounted onto the toolholder body 102 of the toolholder 100, the lower surface 220 of the round cutting insert 200 engages with the pocket floor 112 of the toolholder 100, and the exterior side surface 230 is proximate to the pocket sidewall 115 of the toolholder 100.

As shown in the illustrated example of FIGS. 4 to 6, the upper surface 210 may be generally planar and terminate in a circular cutting edge 211 surrounding the upper surface 210. However, the upper surface 210 is not necessarily limited to the illustrated form.

Referring to FIGS. 4 to 6, the radius of the upper surface 210 may be greater than a radius of the lower surface 220. Also, the exterior side surface 230 may have a shape that is complimentary to the shape of the pocket sidewall 115, typically a frustoconical shape. However, the exterior side surface 230 is not necessarily limited to the illustrated frustoconical shape.

The interior side surface 240 defines aperture 241 that is centrally disposed through the round cutting insert 200. As shown to FIGS. 7 and 8, a fastener 300 (e.g., screw) may be inserted through the aperture 241 and bore 114 to secure the cutting insert 200 to the toolholder 100 within the toolholder pocket 110.

Referring to FIGS. 5 and 6, a plurality of lugs 221 on the lower surface 220 are arranged radially about the aperture 241. Preferably, the plurality of lugs 221 are arranged about the entire periphery of the aperture 241. Adjacent lugs of the plurality of lugs 221 are radially offset by a lug offset angle y. In an aspect a ratio of the lug offset angle y to the groove offset angle x is an integer greater than or equal to 2. Preferably, as in the illustrated example, the ratio of the lug offset angle y to the groove offset angle x is 2. In an alternative example, the ratio of the lug offset angle y to the groove offset angle x may be 3. In another alternative example, the ratio of the lug offset angle y to the groove offset angle x may be 4.

By selecting the ratio of the lug offset angle y to the groove offset angle x to be an integer greater than or equal to 2, the plurality of lugs 221 may be positioned within the plurality of grooves 120 such that the cutting insert 200 may be rotated with respect to the toolholder pocket 110 in small amounts defined by the groove offset angle x. Thus, the minimum amount of rotation of the cutting insert 200 is limited by the groove offset angle x rather than by the lug offset angle y. Manufacturing the plurality of grooves 120 to have a small groove offset angle x may easier than manufacturing the plurality of lugs 221 to have a small lug offset angle y. Therefore, by limiting the minimum rotation of the cutting insert by only the groove offset angle x, the present description provides for a cutting tool 10 having a low minimum rotation of the cutting insert 100 while minimizing difficulties of manufacturing of the cutting insert 100.

In an aspect, the groove offset angle is in a range of from 7 to 17 degrees. In a first example, the groove offset angle is in a range of from 7 to 9 degrees, preferably 7.5 degrees. In a second example, the groove offset angle is in a range of from 9 to 11 degrees, preferably 10 degrees. In a third example, the groove offset angle is in a range of from 14 to 16 degrees, preferably 15 degrees. A groove offset angle of about 7.5 degrees or about 15 degrees is beneficial because the 7.5 or 15 degree groove offset angle enables for rotation of the cutting insert 200 in standard amounts of 90 degrees, 60 degrees, and 45 degrees, which provides for 4 rotations (360 degrees/90 degrees), 6 rotations (360 degrees/60 degrees), and 8 rotations (360/45 degrees). The groove offset angle of 7.5 degrees would provide for additional flexibility in the angles of rotation of the cutting insert upon repositioning, and the groove offset angle of 15 degrees would provide for ease of manufacturing of the lugs and grooves in the cutting insert and pocket floor. A groove offset angle of about 10 degrees would enables for rotation of the cutting insert 200 in amounts of, for example, 90 degrees, 60 degrees, and 40 degrees, which provides for 4 rotations (360 degrees/90 degrees), 6 rotations (360 degrees/60 degrees), and 9 rotations (360/40 degrees).

The cutting insert 200 would provide for replacement of conventional round cutting inserts that have a defined number of grooves therein for engaging with a corresponding number of lugs on a toolholder pocket. Thus, the cutting insert 200 would eliminate or reduce the need for creating multiple cutting inserts having differing number of grooves to satisfying differing requirements regarding depth of cut and number of rotations of the cutting insert upon repositioning.

In an aspect, the lug offset angle is in a range of from 14 to 32 degrees. In a first example, the lug offset angle is in a range of from 14 to 16 degrees, preferably 15 degrees. In a second example, the lug offset angle is in a range of from 19 to 21 degrees, preferably 20 degrees. In a third example, the lug offset angle is in a range of from 29 to 31 degrees, preferably 30 degrees.

A lug offset angle of about 15, about 20, or about 30 degrees is beneficial because these degree lug offset angles are twice of the groove offset angles of about 7.5, about 10, and about 15, and thus alternating grooves in the pocket floor may be engaged with lugs of the cutting insert to ensure high resistance against rotation of the cutting insert. A lug offset angle of three times the number of grooves, i.e., about 22.5 degrees, about 30 degrees, or about 45 degrees, or a lug offset angle of four times the number of grooves, i.e. about 30 degrees, about 40 degrees, or about 60 degrees, etc., would also function, but would result in less engagement between grooves in the pocket floor and lugs of the cutting insert.

Also, a lug offset angle of 30 degrees is beneficial because the 30 degree lug offset provides for enough clearance between lugs for ease of manufacturing during a process of machining the lugs at the bottom of the cutting insert. A smaller lug offset angle of about 20 degrees or about 15 degrees would also function but machining of the lugs would be increasingly challenging.

The lower surface 220 may include landing 222 extending about a periphery of the lower surface 220. The landing 222 may function to engage with the base 118 of the pocket floor 112 to support the cutting insert 200 when fastened within the toolholder pocket 110. The landing 222 may typically take the form a generally planar surface. The landing 222 may having a landing width 223 sufficient to support the cutting insert 200 when fastened within the toolholder pocket 110.

The plurality of lugs 221 on the lower surface 220 may be positioned within a depressed cavity 224 that is depressed relative to the landing 222. By positioning the plurality of lugs 221 within the cavity 224, the cutting insert 200 may be primarily supported by the landing 222 when fastened within the toolholder pocket 110, and the plurality of lugs 221 may primarily function to prevent unintended rotation of the cutting insert 200 within the toolholder pocket 110.

Each lug 221 may be defined by a structure of the cutting insert 200 extending from a trough 225 to a crest 226 to an adjacent trough 225, having a height 227 and length 228. The height 227 corresponds to a depth of the grooves 120 in the pocket floor 112. Thus, the lugs have first lug engagement surfaces that corresponds to the first segment engagement surfaces 122 and second lug engagement surfaces that corresponds to the second segment engagement surfaces 123. The lugs may define a maximum angular lug width 229, which is defined in terms of degrees about the aperture 241. In an aspect, the maximum angular segment width 229 of each lug 221 may be less than the groove offset angle x to facilitate a maximum density of lugs 221 and segments 121 and to avoid interference of the lugs 221 with the segments 121 during placement of the cutting insert 200 within the pocket floor 112 of the toolholder 100.

Figure 8:
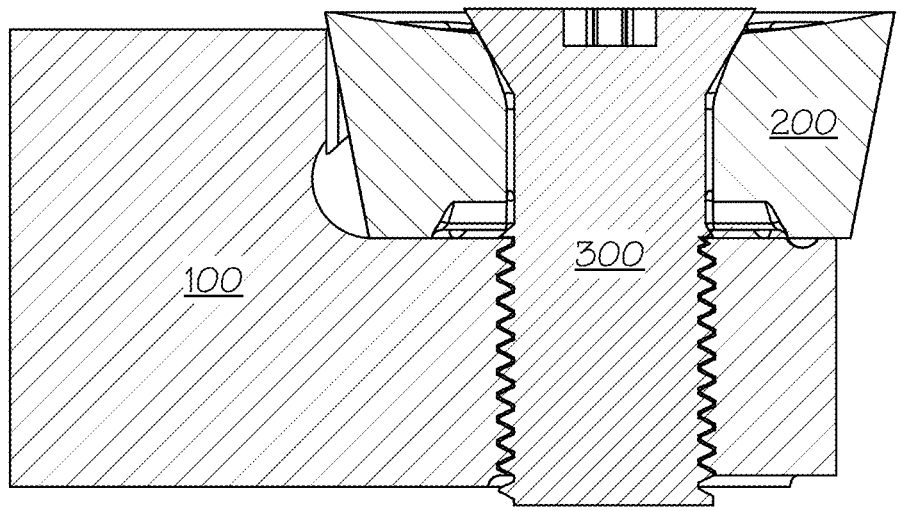
FIG. 8 is sectional view of FIGS. 3 and 6 along section lines C-C and D-D and including a fastener, in a fully fastened state.
Figure 9:
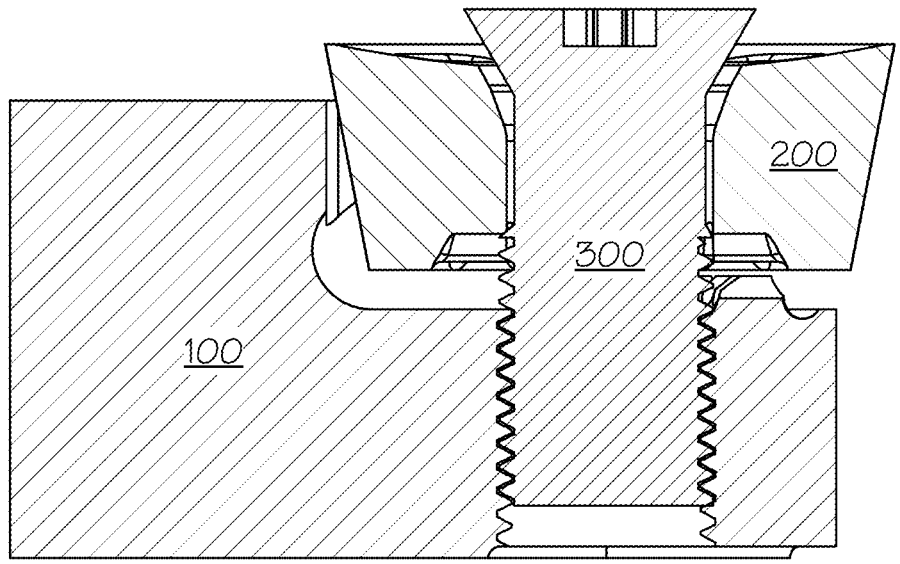
FIG. 9 is sectional view of FIGS. 3 and 6 along section lines C-C and D-D and including a fastener, in a partially unfastened state.

With references to FIGS. 8 and 9, the present description includes a method for repositioning the round cutting insert 200 in the toolholder pocket 110. FIG. 8 illustrates the cutting insert 200 fully fastened within the toolholder pocket 110 by fastener 300. FIG. 9 illustrates the cutting insert 200 partially unfastened from the toolholder pocket 110 such the plurality of lugs 221 are capable of being disengaged with the plurality of grooves 120 by lifting the cutting insert 200 away from the pocket floor 112. Alternatively, the cutting insert 200 may be fully unfastened from the toolholder pocket 110. Once the plurality of lugs 221 are disengaged with the plurality of grooves 120, the round cutting insert may be rotated by a rotation angle z and then the cutting insert 200 may be again fully fastened within the toolholder pocket 110 by fastener 300.

In the case that the groove offset angle is, in the first example, about 15 degrees, the cutting insert 200 may be rotated by a rotation angle z in increments of 15 degrees. Thus, the cutting insert 200 may be rotated by, for example, a rotation angle z of about 45 degrees to provide for 8 total of rotations before replacement of the cutting insert. Alternatively, the same cutting insert 200 may be rotated by a rotation angle z of about 60 degrees to provide for 6 total of rotations before replacement of the cutting insert. Alternatively, the same cutting insert 200 may be rotated by a rotation angle z of about 90 degrees to provide for 4 total of rotations before replacement of the cutting insert.

In the case that the groove offset angle is, in the second example, about 10 degrees, the cutting insert 200 may be rotated by a rotation angle z in increments of 10 degrees. Thus, the cutting insert 200 may be rotated by, for example, a rotation angle z of about 40 degrees to provide for 9 total of rotations before replacement of the cutting insert. Alternatively, the same cutting insert 200 may be rotated by a rotation angle z of about 60 degrees to provide for 6 total of rotations before replacement of the cutting insert. Alternatively, the same cutting insert 200 may be rotated by a rotation angle z of about 90 degrees to provide for 4 total of rotations before replacement of the cutting insert.

In the case that the groove offset angle is, in the third example, about 7.5 degrees, the cutting insert 200 may be rotated by a rotation angle z in increments of 7.5 degrees. Thus, the cutting insert 200 may be rotated by, for example, a rotation angle z of about 22.5 degrees to provide for 16 total of rotations before replacement of the cutting insert. Alternatively, the same cutting insert 200 may be rotated by a rotation angle z of about 30 degrees to provide for 12 total of rotations before replacement of the cutting insert. Alternatively, the same cutting insert 200 may be rotated by a rotation angle z of about 45 degrees to provide for 8 total of rotations before replacement of the cutting insert.

Thus, the toolholder 100 and cutting insert 200 of the present description provide for a single cutting tool 10 that provides for a durable and effective anti-rotation mechanism while providing flexibility for the user to select a number of total desired rotations (e.g., 4 rotations, 6 rotations, 8 rotations) depending on the desired depth of the cut for the machining operation.

Although various embodiments of the disclosed cutting tool have been shown and described, modifications may occur to those skilled in the art upon reading the specification. The present application includes such modifications and is limited only by the scope of the claims.

What is claimed is:

1. A cutting tool, comprising:
  a toolholder comprising:
    a toolholder pocket floor having a bore therein; and
    a plurality of grooves in the pocket floor arranged radially about the bore, wherein adjacent grooves are radially offset by a groove offset angle x; and
  a round cutting insert for mounting on the toolholder pocket floor, the round cutting insert comprising:
    an upper surface having a cutting edge;
    a lower surface opposite the upper surface, the lower surface comprising a landing extending about a periphery of the lower surface;
    an exterior side surface between the upper surface and the lower surface;
    an interior side surface defining an aperture extending from the upper surface to the lower surface; and
    a plurality of lugs arranged radially about the aperture, wherein adjacent lugs are radially offset by a lug offset angle y, and wherein a ratio of y:x is an integer greater than or equal to 2, and wherein the plurality of lugs are positioned within a depressed cavity that is depressed relative to the landing.

2. The cutting tool of claim 1, wherein the groove offset angle is in a range of 7 to 17 degrees.

3. The cutting tool of claim 1, wherein the ratio of y:x is 2, 3, or 4.

4. The cutting tool of claim 1, wherein the ratio of y:x is 2.

5. A method for repositioning the round cutting insert in the toolholder for the cutting tool of claim 1, the method comprising:
  partially or fully unfastening the round cutting insert from a toolholder pocket of the toolholder;
  rotating the round cutting insert by a rotation angle z; and
  fastening the round cutting insert in the toolholder pocket.

6. The method of claim 1, wherein the rotation angle is about 45 degrees.

7. The method of claim 1, wherein the rotation angle is about 60 degrees.

8. The method of claim 1, wherein the rotation angle is about 90 degrees.

9. A round cutting insert, comprising:
  an upper surface having a cutting edge;
  a lower surface opposite the upper surface, the lower surface comprising a landing extending about a periphery of the lower surface;
  an exterior side surface between the upper surface and the lower surface;
  an interior side surface defining an aperture extending from the upper surface to the lower surface, the aperture having a central axis extending from the lower surface to the upper surface; and
  a plurality of lugs arranged radially about the aperture adjacent to the landing, wherein adjacent lugs are radially offset by a lug offset angle y, and wherein the plurality of lugs are positioned within a depressed cavity that is depressed relative to the landing, and wherein each of the plurality lugs comprises a trough and a crest extending from the trough along the central axis.

* * * * *